Figure 1:
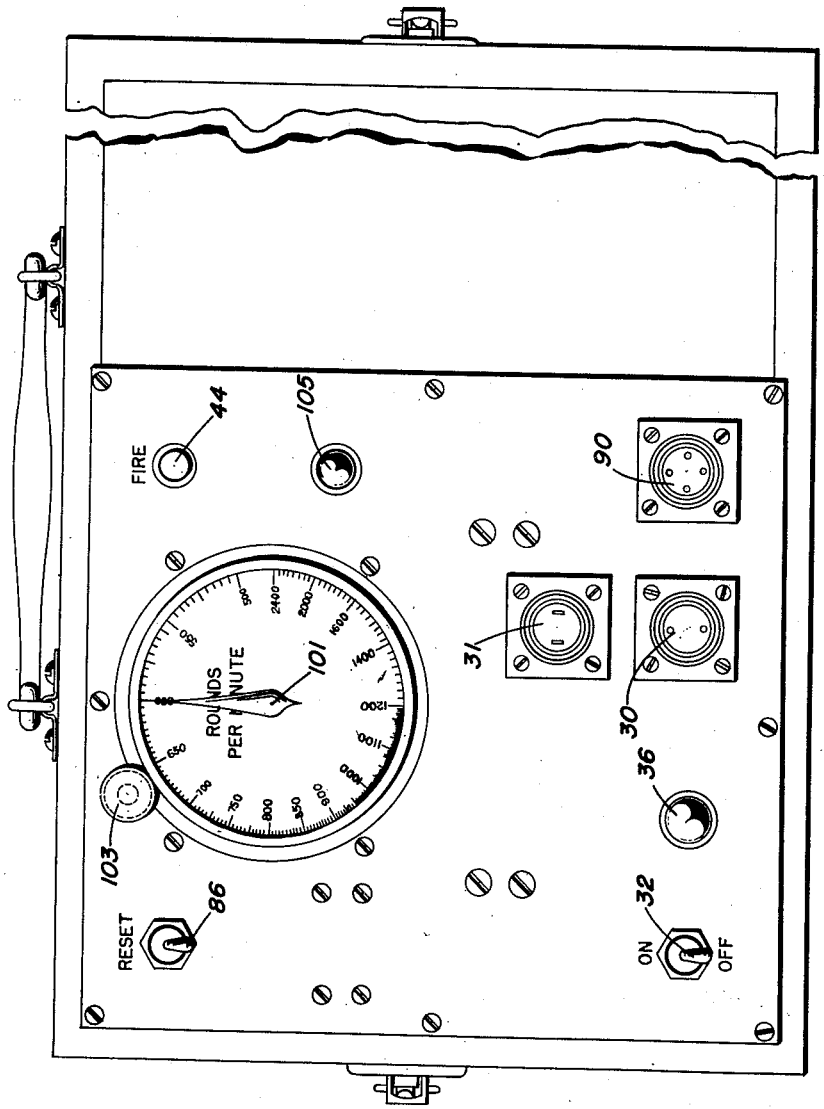

May 13, 1952  E. R. GILBREATH  2,596,143
CYCLE RATE TIMER
Filed July 18, 1949  2 SHEETS—SHEET 1

INVENTOR
EARL R. GILBREATH
BY
ATTORNEY

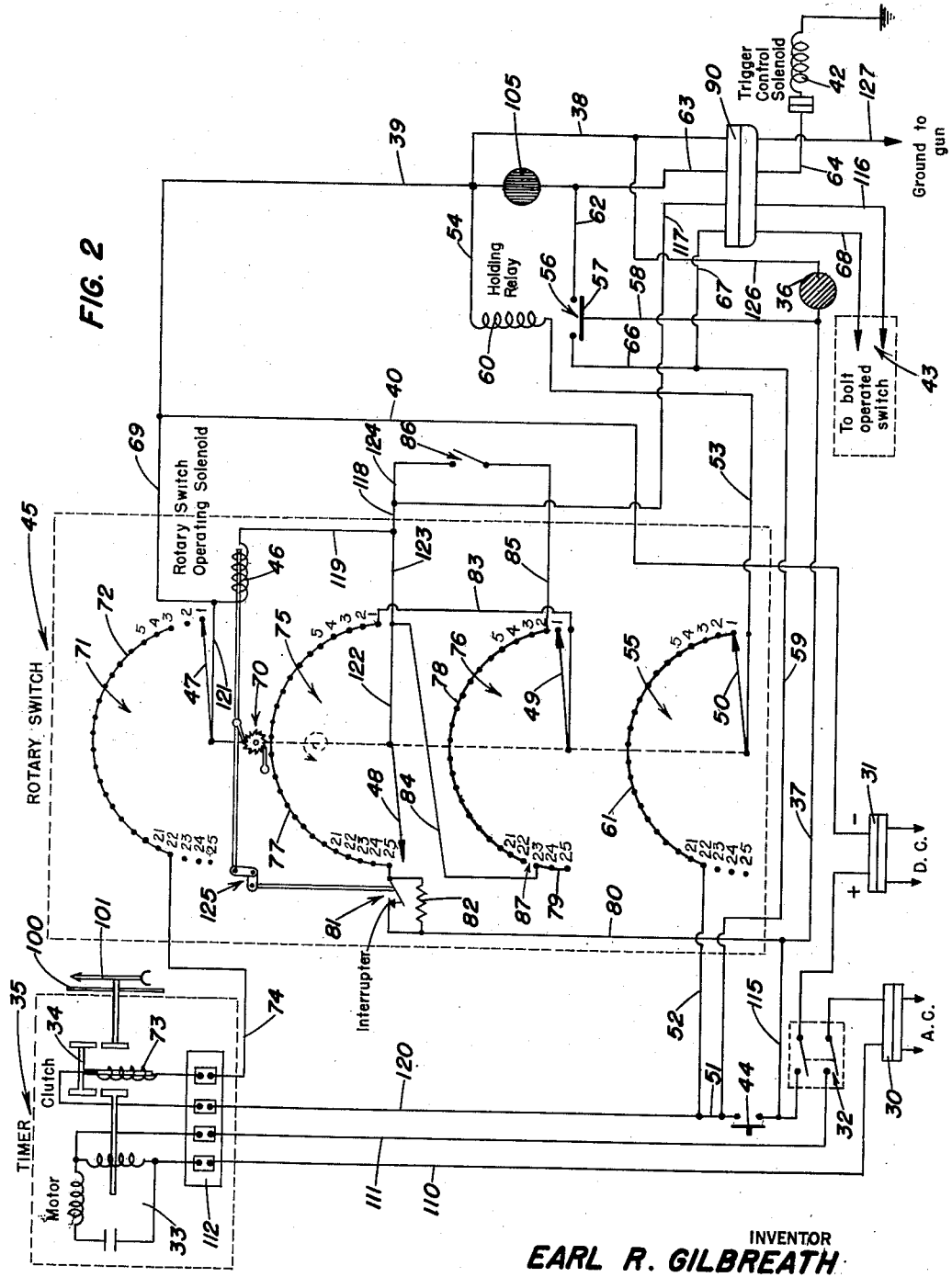

Patented May 13, 1952

2,596,143

UNITED STATES PATENT OFFICE 2,596,143

CYCLE RATE TIMER

Earl R. Gilbreath, Washington, D. C.

Application July 18, 1949, Serial No. 105,435

7 Claims. (Cl. 73—167)

(Granted under the act of March 3, 1883, as amended April 30, 1928; 370 O. G. 757)

The present invention relates to timing devices for determining the rate of operation of cyclically operating machines, and more particularly to an electric device which may be attached to rapid fire automatic guns such as 30 or 50 caliber and 20 or 50 millimeter machine guns to determine their rate of fire.

The present device affords a unitary and compact rate-of-fire timing device for testing automatic guns, which because of its compactness and absence of delicate parts may be employed as a portable unit for the purpose of field testing. The entire operation following the initial closing of a control switch is automatic and removed from human control, thereby affording an exceedingly accurate apparatus whose operation is free from human error.

One object of the present invention is to produce a timing device for the test firing of automatic guns to determine the rate of fire thereof, or for the testing of cyclically operating machines to determine the rate of operation thereof, whose operation, except for the initial throwing of a switch, is totally automatic and whose parts are sturdy and substantial, thereby enabling a more accurate and reproducible determination of the type desired than has heretofore been possible in such an apparatus without the employment of delicate electronic equipment.

A further object of the present invention is to produce a device of the nature mentioned which automatically fires an automatic gun for a predetermined number of rounds, or initiates a cyclically operating machine for a predetermined number of cycles, and upon completion of the test indicates upon its face the rate of operation thereof.

A still further object of the present invention is to provide a device for determining the rate of operation of a cyclically operating machine.

In general, the present invention comprises an electrical circuit and associated electrical apparatus for accomplishing the foregoing objects, which includes a ganged multiple bank multiple step rotary switch, a trigger operating solenoid, a bolt operated switch, a solenoid for operating the ganged multiple bank rotary switch, and a timer. The trigger operating solenoid is electrically connected to one bank of the gang switch and is controlled thereby, causing the gun to be fired for a predetermined number of rounds, while the bolt operated switch, by alternate energization and deenergization of the rotary switch operating solenoid, controls a step by step advance of said switch in accordance with the firing of each round by the gun. A second bank of said switch controls the operation of the timer causing it to register only during the firing of the gun as controlled by the first bank thereof. Thus the gun being tested is automatically fired for a predetermined number of rounds while the timer indicator is automatically controlled to register only during the firing of a predetermined number of said rounds. In addition, the present device is provided with means for automatically resetting the rotary switch to starting position upon completion of a test and for manually causing a return to starting position in the event that the test is interrupted before completion.

Although herein specifically described in its application to test firing of automatic guns, the present device is equally applicable to testing the rate of operation of any cyclically operating machine. In its broader application, the trigger operating solenoid controls the main switch of the machine to initiate its cyclic operation for a predetermined number of cycles, and the bolt switch is operated by any suitable cyclically operating element in the machine to control the step by step advance of the rotary switch.

The above description of the invention will be more fully understood by reference to the following detailed disclosure thereof as applied to an automatic gun, which is made in conjunction with the accompanying drawings in which:

Fig. 1 is a face view of the instrument casing showing the timer dial and indicator at zero position, the various receptacles for the electrical connections to be made to the instrument, and the various control switches for said instrument; and Fig. 2 is a detailed wiring diagram of the instrument.

The timer 35 of the present device may be driven by any suitable means such as clockwork etc., but in the embodiment illustrated is driven by a constant speed alternating current electric motor 33 to which A. C. current may be supplied by means of wires 110 and 111 leading to connector 112. One pole of a double pole single throw master switch 32, or other suitable means, controls the timer motor. The shaft of motor 33 may act through a clutch member 34 to drive an indicating pointer 101 over a dial 100 which is preferably graduated in rounds per minute as illustrated in Fig. 1. The clutch 34 normally leaves the pointer and motor shafts disengaged, but may bring them into functional engagement by energization of a solenoid 73.

The other pole of the master switch, or other suitable means, connects the remainder of the circuit to a D. C. source, and closure thereof immediately illuminates lamp 36 through leads 115, 37, 126, 38, 39 and 40 indicating that the instrument is ready for operation. With the instrument suitably connected to an automatic gun, such as a machine gun or the like, through the trigger control solenoid 42, and through the bolt operated circuit 43 controlled by a suitable bolt operated switch, not shown, momentary closing of firing switch 44 initiates the test which then automatically continues to completion, whereupon indicator 101 shows the rate of fire of the gun, its dial 100 being calibrated preferably in rounds per minute.

The operation of this device is effectuated primarily by a ganged four bank multiple step switch 45 in conjunction with its operating solenoid 46 and the bolt operated switch, not shown. As each round is fired, the gun bolt opens and closes the bolt switch thereby alternately energizing and deenergizing the rotary switch operating solenoid 46, which in turn causes a measured step by step rotation of the rotary gang switch by means of a suitable pawl and ratchet arrangement 70, or the like, each step corresponding to the distance between each stop, numbered 1 through 25, on the various faces of the rotary switch. The various banks of the rotary gang switch are so connected in the timer and control circuits as to control the timer clutch and the trigger control solenoid to permit only a predetermined number of rounds to be fired by the gun and to close the timer clutch into operative position only during the time that a predetermined number of said shots are being fired. As shown in the drawings, the rotary switch plates are so wired and arranged in the circuit as to permit of two warm-up shots, and upon completion thereof the time required for firing shots three through twenty-two are timed, thereby obtaining the time required for twenty shots, the dial 100 of the indicator being accordingly calibrated, reads directly in rounds per minute. However, any desired number of warm-up shots or timed shots may be employed and the dial may be calibrated in any desired manner.

The ganged wipers of the four bank rotary switch are so positioned relative to each other that wipers 47, 49 and 50 are always in corresponding positions on their respective switch faces, while wiper 48 is always positioned opposite therefrom. In zero position, wipers 47, 49 and 50 are located on stop 1 while wiper 48 is located one step after stop 25. When firing switch 44 is momentarily closed with the wipers in zero position, the holding relay 60 is immediately energized through leads 51 and 52, the wipe 61 on rotary switch face 55, wiper 50, lead 53, coil 60, and leads 54, 39 and 40 to close arm 57 of relay switch 56 to its contacts, this circuit being the holding relay energizing circuit. After relay switch 56 has been once closed, upon opening switch 44 the holding relay remains energized by current being supplied to its coil through leads 115, 37 and 58, relay switch arm 57, leads 66 and 59, and thence through the holding relay energizing circuit, this circuit being the holding relay circuit.

The fire control face 55 and its associated wiper 50 of rotary switch 45 operate in conjunction with the holding relay 60 to operate the trigger control solenoid 42, for so long as wiper 50 remains in contact with its wipe 61, the holding relay remains energized and current can energize the trigger solenoid 42 through leads 115, 37 and 58, relay switch arm 57, and leads 62, 63 and 64, this being the trigger control circuit, thereby maintaining the fire of the gun. But as soon as twenty-two shots have been fired, wiper 50 reaches stop 23 and becomes disconnected from wipe 61 thereby deenergizing relay 60 and breaking the firing circuit. Closure of the firing circuit also functions to illuminate the warning light 105 so long as the gun is firing.

As mentioned above, the ganged banks of the rotary switch are operated step by step by each round fired by the gun. This is accomplished by means of the rotary switch operating solenoid 46 and its energizing circuit. When firing switch 44 is closed, this circuit includes leads 59, 67, 68, 116, 117, 118 and 119, solenoid 46 and leads 69 and 40, and when the holding relay 60 is energized, this circuit includes leads 115, 37 and 58, relay switch arm 57, leads 66 and 67, and the remaining portion of the rotary switch operating relay circuit described immediately above. This circuit is alternately opened and closed by the bolt operated switch in response to each cycle of the gun's bolt as activated by each round of ammunition fired. The alternate opening and closing thereof causes an alternate energizing and deenergizing of rotary switch operating solenoid 46, thereby causing a step by step progression of the wipers across the faces of the switch as actuated by a suitable pawl and ratchet 70 or other suitable arrangement.

The step by step progression of the wipers is indicated by stops 1 through 25 on each face of the rotary switch, which stops on face 71 are tied by a continuous wipe 72 from stops 3 to 22 thereof, stops 1, 2, and 23 through 25 being disconnected from said wipe. The continuous wipe 72 provides for activation of the timer clutch solenoid 73 only during the firing of rounds 3 through 22. The timer clutch control circuit includes leads 51 and 120, solenoid 73, lead 74, wipe 72, wiper 47, and leads 121, 69, and 40 when the firing switch 44 is closed, but when relay 60 is energized and the firing switch 44 released, then lead 51 is preceded in this circuit by leads 115, 37 and 58, relay switch arm 57, and leads 66 and 59. Thus, after the firing of the two warm-up rounds (as indicated by stops 1 and 2) the clutch solenoid is energized during rounds three through twenty-two to engage the timer motor armature with the pointer shaft, the dial indicator or pointer thereby rotating at a predetermined speed during this time as controlled by the constant speed motor 33. On completion of the firing of the twenty-second round, the wiper 47 moves off the wipe 72 to stop 23 thereby breaking the timer clutch control circuit and deenergizing the solenoid 73, causing the timing motor armature to become disengaged from the pointer shaft to stop the dial indicator 101. With the dial properly calibrated according to the predetermined number of rounds used for the test, it can be read directly in terms of rate of fire, such as rounds per minute, or in terms of any other desired calibration.

The present invention is also provided with means in the timing circuit for resetting the wipers to their zero position. Wipe 77 on face 75 of rotary switch 45 and wipe 79 on face 76 thereof form parts of an automatic resetting circuit which enables the wipers to return to zero position automatically upon the completion of a test. Wipe 78 on face 76 of the rotary switch 45 forms a part of a manually controlled resetting circuit, whereby the wipers may be reset to zero position in the event a test is interrupted before completion, by a jam in the gun or like cause.

The automatic resetting circuit includes, in part, leads 115 and 86, interrupter 81, shunted by resistor 82 to prevent sparking across the interrupter, wipe 77, wiper 48, leads 122, 123 and 119, the coil of switch operating solenoid 46, and leads 69 and 40, while another portion of this resetting circuit includes lead 83, wiper 49, wipe 79, and lead 84. When round twenty-two has been fired, trigger control wiper 50 moves off of wipe 61 to stop 23 thereby deenergizing the trigger control solenoid and ending the firing of the gun. Except for the automatic reset circuit, the wipers 47, 49 and 50 would then remain at stops 23. However, when the wipers reach stops 23, wiper 49 closes the automatic resetting circuit through wipe 79 thereby energizing the switch operating solenoid 46. This solenoid is mechanically linked to the interrupter 81 by means of the bell crank linkage 125, or the like, so that operation of the solenoid breaks its own energizing circuit thereby becoming deenergized and causing the interrupter to again close the circuit. This making and breaking of the solenoid operating circuit proceeds in the same manner as a conventional buzzer thereby enabling said solenoid to continue to rotate the switch wipers after firing of the gun has ceased. Wipe 79 extends from stop 23 to stop 25. After wiper 49 is caused by the above described operation to pass beyond stop 25, wiper 48, being in a position opposite from wiper 49 is brought into contact with stop 1 of switch face 75 so that the operation of this automatic resetting circuit continues through wiper 48, its wipe 77, and the first above denoted portion of the resetting circuit, to continue the alternate energizing and deenergizing of solenoid 46 in cooperation with the interrupter 81, until said wiper passes beyond stop 25 on switch face 75. At this time wipers 47, 49 and 50 are at stops 1, their zero position, leaving the automatic resetting circuit open, and the instrument in readiness for the next test.

In the event the gun jams during the test or the test is interrupted for some reason, the wipers are not then in position to initiate the automatic resetting circuit and the wipers are unable to return to zero to enable a new test to be run. To meet this contingency a manually controlled resetting circuit is provided. This circuit includes leads 115 and 80, interrupter 81, wipe 77, lead 83, wiper 49, wipe 78, lead 85, reset switch 86, leads 124, 118 and 119, switch operating solenoid 46, and leads 69 and 40. Thus if at any point between the zero position and the twenty-second round the test is interrupted, this resetting circuit, upon closing of reset switch 86, causes the rotary wipers to advance step by step, by the same process as described for the automatic resetting circuit, for the duration of contact of wiper 49 with wipe 78. Upon reaching stop 22, wiper 49 is caused to jump the gap 87 by the last impulse imparted by the manually controlled resetting circuit to contact wipe 79, thereby initiating the automatic resetting circuit described above, which causes the step by step advance of the wipers to continue until they have been returned to their zero position.

In operating the above described instrument, the necessary connections are made to the instrument, including preferably an A. C. source through socket 30 for operating the timer motor and a D. C. source through socket 31 for operating the various control and operating circuits described above, the bolt operated switch is properly affixed to the gun and its leads connected in the D. C. circuits through socket 90, the trigger control solenoid is properly positioned on the gun and also connected by its lead to the D. C. circuits through socket 90, and the ground lead 127 is connected to the gun. The timer indicator 101 is zeroed by means of its setting knob 103. The master switch 32 is then closed thereby closing the timer motor circuit and closing a portion of the D. C. circuit to illuminate the green lamp 36 indicating a condition of readiness for operation. Thereafter, a momentary closing of the firing switch 44 illuminates the red warning light 105, causes the gun to start firing, and places the various control and operating circuits in operation as described in detail above. After the gun has fired a predetermined number of warm up rounds and timed rounds it ceases firing, the warning light 105 goes off, the timing indicator stops, and the multiple bank multiple contact gang switch 45 resets itself in readiness for the next test. If during the test the process is interrupted, such as by a jamming of the gun or the like, the device may be reset by closing the reset switch, and with the cause of the interruption removed the test may be started again by closing the firing switch after the timer has been zeroed. Upon completion of a test the rate of fire of the gun may be read directly off the calibrated dial 100 as indicated by its indicator 101.

Although the present embodiment of this invention is described as applied to testing the rate of fire of guns, this is only by way of example, and it may be employed for a rate determination and the like of other cyclically operating machinery whose operation is such so as to permit, as will be apparent to those skilled in the art. In addition, modifications of the invention will be apparent to those skilled in the art, and such as are within the spirit and scope thereof, as defined by the appended claims, are within the monopoly of the present patent.

The invention described herein may be manufactured and used by or for the Government of the United States of America for governmental purposes without the payment of any royalties thereon or therefor.

What is claimed is:

1. An electric cycle rate timer for determining the rate of fire of an automatic gun comprising a ganged multiple bank multiple step switch, each bank comprising a wipe and wiper therefor, an operating solenoid for said switch, a bolt operated switch for alternately energizing and deenergizing said solenoid thereby causing a step by step movement of said wipers relative to said wipes in accordance with the number of rounds fired, a trigger control solenoid for actuating the trigger of said gun, the wipe and wiper of one switch bank maintaining said trigger solenoid in an energized state for a predetermined number of switch steps, a timing motor, an indicator, a clutch for engaging and disengaging said indicator and motor, and a solenoid for operating said clutch, the wipe and wiper of a second switch bank permitting energization of said clutch solenoid for a predetermined number of said steps, said gun thereby being caused to fire a predetermined number of rounds and said clutch engaging said timing motor and indicator during a predetermined number of said rounds, said indicator thus denoting the rate of fire of said gun.

2. A cycle rate timer for determining the rate of fire of an automatic gun comprising a ganged multiple bank multiple step switch, each bank comprising a wipe and wiper therefor, an operating solenoid for said switch, a bolt operated switch for alternately energizing and deenergizing said solenoid thereby causing a step by step movement of said wipers relative to said wipes in accordance with the number of rounds fired, a trigger control means, the wipe and wiper of one switch bank enabling actuation of said trigger control means for a predetermined number of switch steps, and a timing means, the wipe and wiper of another switch bank enabling actuation of said timing means for a predetermined number of said steps, said gun thereby firing a predetermined number of rounds and said timing means being actuated during the firing of a predetermined number of said rounds to denote the rate of fire of said gun.

3. A cycle rate timer for determining the rate of operation of a cyclically operating machine comprising a ganged multiple bank multiple step switch, each bank comprising a wipe and wiper therefor, means for causing a step by step movement of said wipers relative to said wipes, a cycle responsive means for controlling said last-mentioned means to correlate said step by step movement with the number of cycles completed by said machine, means for initiating the cyclic operation of said machine, the wipe and wiper of one switch bank enabling actuation of said initiating means for a predetermined number of switch steps, and a timing means, the wipe and wiper of another switch bank enabling actuation of said timing means for a predetermined number of said steps, said machine thereby being operated for a predetermined number of cycles and said timing means being actuated during a predetermined number of said cycles to denote the rate of operation of said cyclically operating machine.

4. A cycle rate timer for determining the operating rate of cyclically operating means comprising a ganged multiple bank multiple step switch, each bank comprising a wipe and wiper therefor, an operating solenoid for causing a step by step movement of said wipers relative to said wipes, a cycle responsive switch for alternately energizing and deenergizing said solenoid thereby effecting said step by step movement in accordance with the cyclic action of said cyclically operating means, a timer, and an indicator cooperating with said timer, the wipe and wiper of one switch bank enabling a continual operation of said cyclically operating means for a predetermined number of switch steps, and the wipe and wiper of another switch bank enabling operation of said indicator by said timer for a predetermined number of said steps, said cyclically operating means thus being actuated for a predetermined number of operating cycles and said indicator thus being operated by said timer during a predetermined number of said operating cycles, the indicator thereby denoting the operational rate of said cyclic means.

5. A cycle rate timer for determining the operating rate of cyclically operating means comprising a ganged multiple bank multiple step switch, each bank comprising a wipe and wiper therefor, a cycle responsive operating means for causing a step by step movement of said wipers relative to said wipes and correlating this movement with the cyclic operation of said cyclically operating means, a timing means, and means for initiating the cyclic operation of said machine, the wipe and wiper of one switch bank controlling the actuation of said initiating means to effect continuous operation of said cyclically operating means for a predetermined number of cycles and the wipe and wiper of another switch bank controlling actuation of said timing means to effect operation thereof during a predetermined number of said cyclic operations, said timing means thereby indicating the rate of operation of said cyclically operating means.

6. A rate timer for cyclically operating means comprising a ganged plural bank multiple step switch, each bank comprising a wipe and wiper therefor, an operating solenoid for said switch, a cycle responsive switch controlling said solenoid, a timing means, the cycle responsive switch being controlled by said cyclically operating means to alternately energize and deenergize said solenoid thereby effecting a step by step movement of said wipers relative to said wipes one step per cycle, the wipe and wiper of one switch bank enabling operation of said cyclically operating means for a predetermined number of cycles and the wipe and wiper of another switch bank enabling operation of said timer for the duration of a predetermined number of said cycles, said timer thereby determining the rate of operation of said cyclically operating means, and a zeroing circuit including a third and fourth bank of said multiple bank switch and a circuit interrupter linked to said ganged switch operating solenoid, the wipe and wiper of one of said last-mentioned banks cooperating with the circuit interrupter and switch operating solenoid to cause an alternate energizing and deenergizing of said solenoid, thereby effecting a continual stepping of the multiple bank switch to zero said wipes and wipers automatically after completion of said first-mentioned predetermined number of cycles, and a reset switch cooperating with the switch operating solenoid, the interrupter, and the wipe and wiper of the other of said last-mentioned two switch banks to enable zeroing of said wipes and wipers through step by step movement on interruption of said first-mentioned predetermined number of cycles.

7. A rate timer for cyclically operating means comprising a timer, a ganged plural bank multiple step switch, each bank comprising a wipe and wiper therefor, a cyclically controlled operating means therefor effecting a step by step movement of said wipers relative to said wipes one step per cycle of said cyclically operating means, the wipe and wiper of one switch bank enabling operation of said cyclically operating means for a predetermined number of cycles, the wipe and wiper of another switch bank enabling operation of said timer for the duration of a predetermined number of said cycles, said timer thereby determining the rate of operation of said cyclically operating means, a circuit for zeroing said wipes and wipers activated upon completion of said first-mentioned predetermined number of cycles, and means for activating said zeroing circuit to zero said wipes and wipers on interruption of said first-mentioned predetermined number of cycles.

EARL R. GILBREATH.

REFERENCES CITED

The following references are of record in the file of this patent:

UNITED STATES PATENTS

| Number | Name | Date |
| --- | --- | --- |
| 2,372,757 | Bennett | Apr. 3, 1945 |
| 2,377,011 | Huenergardt | May 29, 1945 |
| 2,437,929 | Bennett | Mar. 16, 1948 |